(12) United States Patent
Bhagwan et al.

(10) Patent No.: US 10,599,871 B2
(45) Date of Patent: Mar. 24, 2020

(54) SYSTEM AND METHOD FOR PRIVACY AWARE INFORMATION EXTRACTION AND VALIDATION

(71) Applicant: OATH INC., New York, NY (US)

(72) Inventors: Varun Bhagwan, San Jose, CA (US); Patrick Mason, Redwood City, CA (US); Ashutosh Singh, San Jose, CA (US); Jaikit Savla, Santa Clara, CA (US); Rahul Teotia, Sunnyvale, CA (US); Ramachandran Natarajan Iyer, Fremont, CA (US)

(73) Assignee: OATH INC., New York, NY (US)

( * ) Notice: Subject to any disclaimer, the term of this patent is extended or adjusted under 35 U.S.C. 154(b) by 6 days.

(21) Appl. No.: 16/129,890

(22) Filed: Sep. 13, 2018

(65) Prior Publication Data
US 2019/0012481 A1    Jan. 10, 2019

Related U.S. Application Data

(63) Continuation of application No. 15/289,396, filed on Oct. 10, 2016, now Pat. No. 10,078,761, which is a continuation of application No. 14/581,647, filed on Dec. 23, 2014, now Pat. No. 9,465,956.

(51) Int. Cl.
| | |
|---|---|
| *H04N 7/16* | (2011.01) |
| *G06F 17/30* | (2006.01) |
| *G06F 7/04* | (2006.01) |
| *G06F 21/62* | (2013.01) |
| *G06Q 30/02* | (2012.01) |
| *H04L 29/08* | (2006.01) |

(52) U.S. Cl.
CPC ...... *G06F 21/6263* (2013.01); *G06F 21/6245* (2013.01); *G06Q 30/0257* (2013.01); *H04L 67/306* (2013.01); *H04L 67/02* (2013.01)

(58) Field of Classification Search
CPC .................... G06F 21/6245; G06F 21/6263
USPC .............................................. 726/26
See application file for complete search history.

(56) References Cited

U.S. PATENT DOCUMENTS

| | | | |
|---|---|---|---|
| 7,024,417 B1 * | 4/2006 | Russakovsky | G06F 16/2465 |
| 7,707,413 B2 | 4/2010 | Lunt et al. | |
| 2006/0031301 A1 * | 2/2006 | Herz | G06F 21/6254 |
| | | | 709/206 |
| 2006/0074986 A1 * | 4/2006 | Mallalieu | G07C 9/00087 |
| 2006/0242180 A1 * | 10/2006 | Graf | G06F 16/86 |
| 2007/0147606 A1 | 6/2007 | Dwork et al. | |
| 2008/0059437 A1 * | 3/2008 | Nagappan | G06F 16/2465 |

(Continued)

OTHER PUBLICATIONS

Charu C. Aggarwal; An Introduction Tosocial Networkdata Analytics; CITESEERX: year: 2011 p. 1-16.*

(Continued)

*Primary Examiner* — Monjur Rahim
(74) *Attorney, Agent, or Firm* — James J. DeCarlo; Greenberg Traurig, LLP

(57) ABSTRACT

Disclosed herein is a system to validate information about a user, or users, derived from publicly-accessible data. The system comprises a validation system that uses private data about the user to validate the user information derived from the publicly-accessible data. The validation system may receive a validation request in connection with an inconclusive result derived from the publicly-accessible data.

20 Claims, 7 Drawing Sheets

(56) References Cited

U.S. PATENT DOCUMENTS

| | | | | |
|---|---|---|---|---|
| 2008/0077451 | A1* | 3/2008 | Anthony | G06Q 10/10 |
| | | | | 705/4 |
| 2009/0170608 | A1* | 7/2009 | Herrmann | G06Q 30/02 |
| | | | | 463/42 |
| 2011/0208808 | A1* | 8/2011 | Corbett | H04L 67/42 |
| | | | | 709/203 |
| 2012/0238353 | A1* | 9/2012 | Herrmann | G06Q 30/02 |
| | | | | 463/25 |
| 2014/0282912 | A1* | 9/2014 | Quigg | G06F 21/6218 |
| | | | | 726/4 |
| 2015/0073929 | A1* | 3/2015 | Psota | G06Q 30/0605 |
| | | | | 705/26.2 |

OTHER PUBLICATIONS

Maximilian Teltzrow; Impacts of User Privacy Preferences on Personalized Systems; Kluwer Academic Publishers; pp. 1-18 (2004).
Cong Wang et al., "Ensuring Data Storage Security in Cloud Computing," IEEE; pp. 1-9 (2009).

* cited by examiner

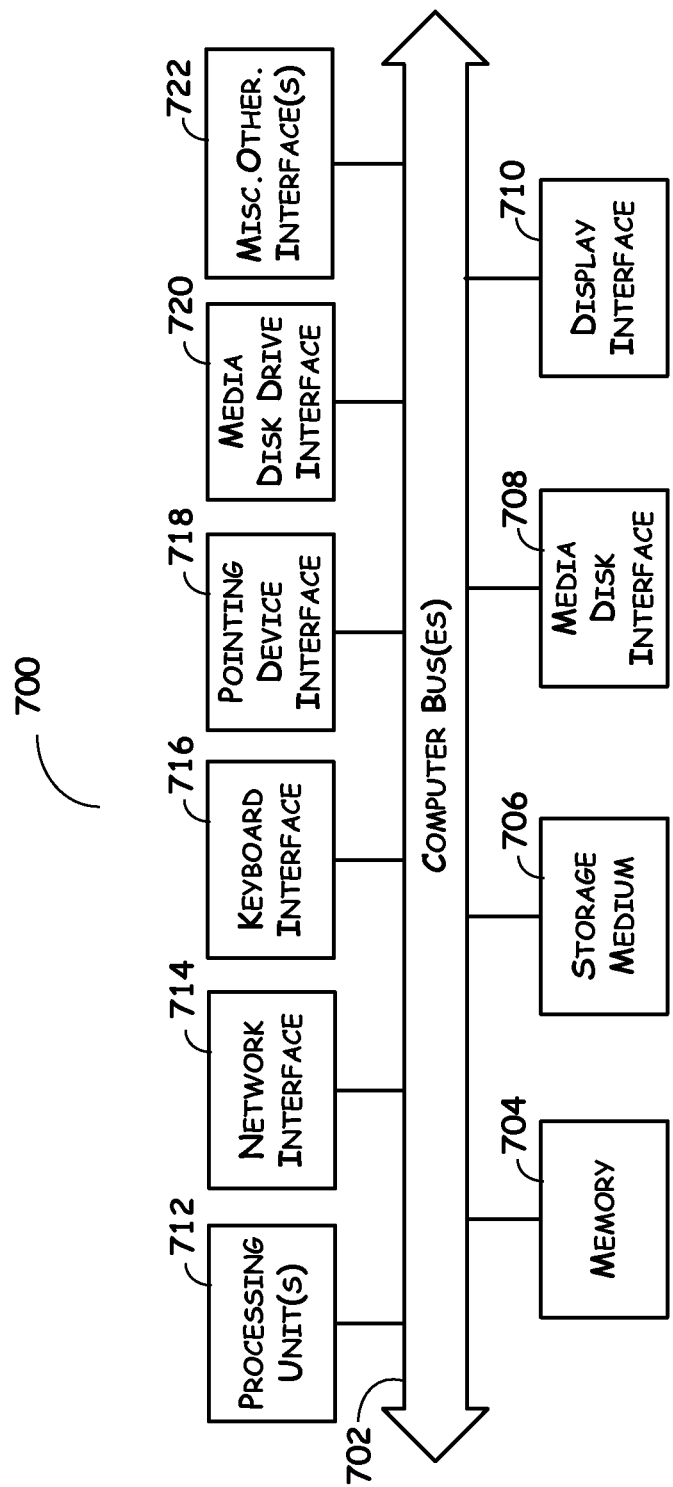

SYSTEM AND METHOD FOR PRIVACY AWARE INFORMATION EXTRACTION AND VALIDATION

CROSS REFERENCE TO RELATED APPLICATIONS

This application is a continuation of and claims priority from co-pending U.S. patent application Ser. No. 15/289,396, filed Oct. 10, 2016, and entitled SYSTEM AND METHOD FOR PRIVACY-AWARE INFORMATION EXTRACTION AND VALIDATION, which is a continuation of and claims priority to U.S. patent application Ser. No. 14/581,647, filed Dec. 23, 2014, and entitled SYSTEM AND METHOD FOR PRIVACY-AWARE INFORMATION EXTRACTION AND VALIDATION, which issued as U.S. Pat. No. 9,465,956 on Oct. 11, 2016, which is hereby incorporated by reference.

FIELD OF THE DISCLOSURE

The present disclosure generally relates to privacy concerns in connection with using user data.

BACKGROUND

Information about a user, such as a user of a computing device, may be collected by a number of services and retained. For example, information about a user's online activities, such as browsing, purchasing, messaging, etc. activities may be gathered and stored. As yet another non-limiting example, information may be collected and stored about a user's offline activities.

SUMMARY

Privacy is a significant concern with respect to data collected and retained about individuals. Such privacy concerns include without limitation concerns about what entity, or entities, are given access to the data and/or information about a user that can be determined from the collected data. A user has little if any control over the manner in which the data/information is used and/or shared. Information about a user may be used, for example and without limitation, to personalize a user's experience, e.g., to personalize a user's online experience by presenting the user with content identified as being of interest to the user using information determined about the user from data collected about the user. As yet some further non-limiting examples, user information might be used to identify users for targeted advertising and/or user information might indicate a user's interest in a product and/or service to recommend to the user. Generally speaking, user information is sought after by a number of entities, such as and without limitation product manufacturers, service providers, advertisers, etc. The value of such information raises the potential for abuses, such as and without limitation unwanted access to the information.

Embodiments of the present disclosure enforce privacy of user data and information, and operate to information derived from publicly-available data. In accordance with one or more embodiments, private data and/or information derived from private data may be used to either confirm or refute observations made about an individual using public data, e.g., publicly available, openly shared data, etc., while safeguarding private data, and information derivable from the private data, from unwanted access. Embodiments of the present disclosure ensure that nothing new is revealed about an individual, where new may refer to anything that is not already publicly accessible or openly shared by the user. In accordance with one or more such embodiments, publicly-available, or public, information may be queried to generate a result, which result may be validated using private data. The result, or output, of the query performed on public data may be validated without providing any of the private data used to validate the result obtained using the public data.

By way of a non-limiting example, assume that public data, e.g., social media data available to the public, data made public by the user, etc., is searched to determine whether the user is interested in soccer. The result of the public data search may yield a decisive yes or no to the question, or the result may lie somewhere in between, e.g., while the public data searched indicates that a user appears to have some interest, the result of the search is inconclusive as to whether or not the user is interested in soccer. In the case of the inconclusive result from the search of the public data, a request may be made to conduct a search of private data, or data not publicly available, in order to confirm whether or not the user is interested in soccer. The private data may comprise data about the user's purchasing, messaging, social networking, browsing, etc. activities, for example. The private messaging data might comprise email, text, chat, etc. messages. The private data may be searched, in response to the request, to derive information about the user's interest, e.g., a strong interest or a weak interest, in soccer. The private data may be searched to determine whether or not there is enough evidence in the private data to support a conclusion that the user is, or is not, interested in soccer.

By way of some non-limiting examples, the private data may indicate that the user has a strong interest in soccer, such private data used to make the determination might include private data indicating that the user has accessed content about soccer, made soccer-related purchases and/or commented about soccer in an electronic message, online post, etc.; alternatively, the private data may indicate that the user has a weak interest in soccer based on an examination of the private data that yields a result that there is little, if any, evidence of an interest by the user in soccer in the private data associated with the user. The response to the request may indicate whether the user has a strong, or conversely has a weak interest in soccer based on a search of the private data, without providing the private data used to make the assessment of the user's interest in soccer.

In accordance with one or more embodiments, a method is provided, the method comprising receiving, by a computing device, a request that is based on a first result derived from publicly-accessible data about at least one user, the request comprising a request to validate the first result derived from the publicly-accessible data indicating an applicability of at least one item of information to the at least one user; generating, by the computing device and in response to the request, a second result derived from private data about the at least one user, the second result being performed to determine whether the private data about the user validates the first result generated using the public data about the at least one user; and providing, by the computing device, a response indicating a validity of the first result derived from the publicly-accessible data, the response comprising an indicator of the applicability of the at least one item of information to the at least one user.

In accordance with one or more embodiments a system is provided, which system comprises at least one computing device, each computing device comprising a processor and a storage medium for tangibly storing thereon program logic for execution by the processor, the stored program logic comprising receiving logic executed by the processor for receiving a request that is based on a first result derived from publicly-accessible data about at least one user, the request comprising a request to validate the first result derived from the publicly-accessible data indicating an applicability of at least one item of information to the at least one user; generating logic executed by the processor for generating, in response to the request, a second result derived from private data about the at least one user, the second result being performed to determine whether the private data about the user validates the first result generated using the public data about the at least one user; and providing logic executed by the processor for providing a response indicating a validity of the first result derived from the publicly-accessible data, the response comprising an indicator of the applicability of the at least one item of information to the at least one user.

In accordance with yet another aspect of the disclosure, a computer readable non-transitory storage medium is provided, the medium for tangibly storing thereon computer readable instructions that when executed cause at least one processor to receive a request that is based on a first result derived from publicly-accessible data about at least one user, the request comprising a request to validate the first result derived from the publicly-accessible data indicating an applicability of at least one item of information to the at least one user; generate, in response to the request, a second result derived from private data about the at least one user, the second result being performed to determine whether the private data about the user validates the first result generated using the public data about the at least one user; and provide a response indicating a validity of the first result derived from the publicly-accessible data, the response comprising an indicator of the applicability of the at least one item of information to the at least one user.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1 provides an overview of components for use in accordance with one or more embodiments of the present disclosure.

FIG. 2 provides a measure of strength example in accordance with one or more embodiments of the present disclosure.

FIG. 3 provides a process flow example for use in accordance with one or more embodiments of the present disclosure.

FIG. 4 provides a targeting system process flow example that may be used in accordance with one or more embodiments of the present disclosure.

FIG. 5 provides a validation system process flow example that may be used in accordance with one or more embodiments of the present disclosure.

FIG. 7 is a detailed block diagram illustrating an internal architecture of a computing device in accordance with one or more embodiments of the present disclosure.

DETAILED DESCRIPTION

Figure 1:
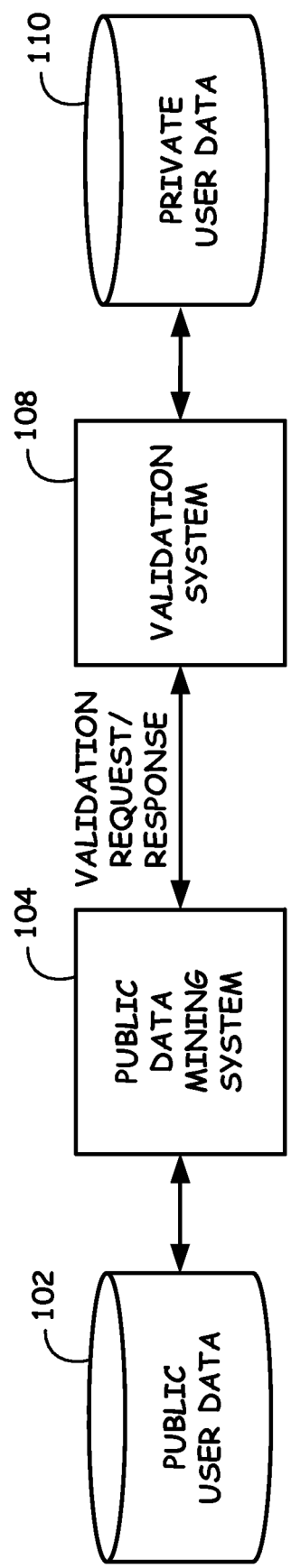

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The detailed description provided herein is not intended as an extensive or detailed discussion of known concepts, and as such, details that are known generally to those of ordinary skill in the relevant art may have been omitted or may be handled in summary fashion. Certain embodiments of the present disclosure will now be discussed with reference to the aforementioned figures, wherein like reference numerals refer to like components.

In general, the present disclosure includes a privacy-aware information extraction and validation system, method and architecture. In accordance with one or more embodiments, information about a user, or group of users, may be derived using publicly-available user data, e.g., by searching one or more repositories of public user data; and private data may be used to confirm the user information derived using the public data. The information about the user(s) may be any information derivable, or obtained, using publicly-available data. For example and without limitation, the user information may include one or more interests of, or other observation(s) about, one or more users. Embodiments of the present disclosure may use private data for validating the user information obtained using the public data without making the private data publicly available. FIG. 1 provides an overview of components for use in accordance with one or more embodiments of the present disclosure.

In the example shown in FIG. 1, component 104, which may be a data mining system, uses public user data 102 to derive user information, e.g., information identifying an interest, or interests, of a user, or users. Examples of public data 102 may include without limitation any data for which there is little, if any, access restriction(s) placed on the data by the user and/or the entity, or entities, gathering and/or retaining the data 102. Such data may include user profile data, online user behavior, such as browsing, content viewing, purchasing, etc. a user's electronic messages, blog posts, content uploads/downloads, and/or data published online, such as data published using one or more web sites including social media sites, such as Flickr™, Twitter™, Facebook™, LinkedIn™, Instagram™, Pinterest™, Tumblr™, Yelp™, etc. Public data 102 may include any public data available for accessing, searching, data mining, etc. by the public. Public data 102 may include data that is available for access by system 104. Public data 102 may include both data collected from online and offline sources of user data available for a search, data mining, etc. computing system, such as system 104.

System 104 may be capable of searching, mining, etc. the data 102, which may be stored in one or more data repositories, such as and without limitation one or more logs, databases, data stores, etc. System 104 may use public data 102 to derive information, or make observations, about a user, or users. By way of a non-limiting example, system 104 may use public data 102 to identify one or more interests of the user(s). System 104 may further identify a degree, or measure, of strength associated with the derived information, or observation. By way of some non-limiting examples, system 104 may determine that a user's interest in something is strong, weak or somewhere in between. The latter case, which may be referred to as an edge case, might be used to indicate that while there is some evidence in the public data to indicate that a user has the given interest, the information generated from the public data 102 is considered to be inclusive. The measure of strength may be an indicator of a level of confidence that system 104 has in the result generated using public data 102, the result comprising at least one item of information or observation about one or more users.

In a case that use of public data 102 yields an inconclusive result, e.g., the result indicates some user interest, but it is not clear from the result derived from the public data 102 that whether the user's interest is strong or weak. In such a case, system 104 may request validation from validation system 108. Of course, it is possible that system 104 might request validation even in a case that the result from the public data 102 is considered to be conclusive.

Validation system 108 has access to private data 110 and limits access to such data by others, including system 104. Examples of private data 110 may include without limitation any data for which access restriction(s) is/are specified by the user and/or the entity, or entities, gathering or retaining the data 110. Such data may include user profile, message, post, content, data published via web sites including social media sites, such as Flickr™, Twitter™, Facebook™, LinkedIn™, Instagram™, Pinterest™, Tumblr™, Yelp™, etc. Private data 110 may include any data that is unavailable for accessing, searching, data mining, etc. by the public. Private data 110 may include both data collected from online and offline sources of user data. Private data 110 may comprise, for example and without limitation, data collected from online user behavior, such as and without limitation browsing, purchasing, etc. behavior, collected by a site or service provider. Private user data 110 may include any user data and/or information derived from private data, and/or public data, which is accessible to validation system 108 and is inaccessible to system 104.

In accordance with one or more embodiments, system 104 and system 108 may each comprise one or more computing devices, such as and without limitation server computing devices. In accordance with one or more embodiments, system 104 and system 108 may be provided by a single entity or different entities. In the latter case, the different entities may be trusted entities, such that a request from system 104 is considered to be from a trusted source and is trusted by system 108; and conversely, a response from system 108 is from a trusted source and is trusted by system 104. Systems 104 and 108 may be components of a closed system, such that each of systems 104 and 108 are trusted systems.

Validation system 108 may receive a request from system 104 to validate a result determined by system 104 using public data 102. The request may be made by system 104 to confirm a result derived from public data 102. By way of a non-limiting example, validation system 106 may provide a response to the request in the form of a yes, or other affirmative indicator, a no or other negative indicator, or unknown. or other inconclusive indicator. A measure of strength may be associated with an operation, e.g., a search, data mining, etc. operation performed using private data 110. A response indicating an inconclusive result may be provided by system 108 if the operation on data 110 fails to yield either an affirmative or a negative answer. The request and response may be made in connection with one user or a group of users.

Figure 2:
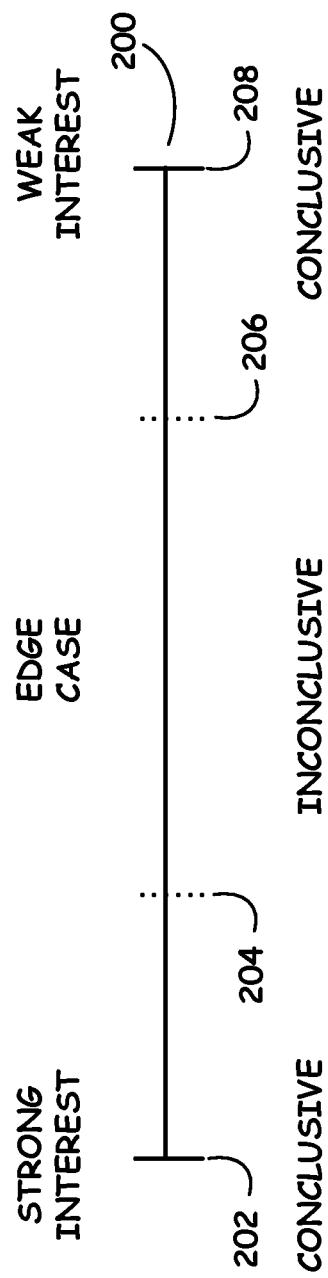

FIG. 2 provides a measure of strength example in accordance with one or more embodiments of the present disclosure. The example shown in FIG. 2 relates to a result, e.g., a result generated by system 104 using public data 102, regarding a user interest. In the example, the result may be considered to be conclusive or inconclusive. A conclusive result may indicate that there is a strong or weak interest on the part of a user, or users. A strong interest may be found, for example and without limitation, in a case that public data 102 includes at least a threshold amount of data indicating the user interest. By way of a non-limiting example, the threshold amount may be a significant amount of data indicating the user interest.

In the example shown in FIG. 2, line 200 may represent a measure of strength, or confidence, in the result, or information, derived from public data 102, and/or private data 110, about the user interest. Position 208, which satisfies threshold 206, represents an example of a case in which public data 102 has little, if any, data to derive an interest on the part of a user, or users. In such a case, the interest may be considered to be, at best, a weak interest, and a result obtained using public data 102 may be considered to conclusively indicate no more than a weak interest. At the other end of the spectrum, position 202, which satisfies threshold 204, represents an example of a case in which the public data 102 includes a significant amount of data indicating a strong interest, and the result obtained using public data 102 may be considered to conclusively indicate a strong interest. Positions 204 and 206 may represent thresholds, such that cases that lie between positions 204 and 206 are examples in which the public data 102 may include some amount of data indicative of the user interest, but not enough to consider the result to be conclusively strong or conclusively weak. Such a case may be referred to as an edge case.

Embodiments of the present disclosure may be used to clarify an edge case detected using public data 102. An edge case may be determined to lie somewhere between two thresholds of strength of the result, which thresholds may be represented at positions 204 and 206. System 104 might elect not to submit a request to system 108 where public data 102 yields a result identifying a user interest that has a measure of strength at or above threshold 204, which might be associated with a conclusively strong result, e.g., a result comprising information indicating a strong user interest, or one that has a measure of strength at or below threshold 206, which might be associated with a conclusively weak result, e.g., a result comprising information indicating a weak user interest. In a case that the public data 102 yields a result with a measure of strength falling between thresholds 204 and 206, system 104 may request that validation system 108 use private data 110 to provide clarification of the resulting information derived from the public data 102.

By way of a non-limiting example, thresholds 204 and 206 may correspond to an amount of data to support a finding that a user, or users are interested in something. A measure of strength associated with positions 204 and/or 206 may be dependent on a given use case. For example, threshold 204 may be lower, which may correspond to a lesser amount of data required to yield a conclusively strong result, where a user interest is being determined for a group of users versus where a user interest is being determined for one user. In a case that a user interest is being determined for a single user, threshold 204 might be raised thereby requiring a greater amount of data for a conclusive result. Thresholds 204 and 206 may be adjusted individually or in combination. For example and in a case that a single user's interest is being determined, threshold 204 may be increased and threshold 206 may be decreased, which may yield more edge cases since a more conclusive result is required for both the strong or weak cases.

In accordance with one or more embodiments, threshold 204 and/or threshold 206 may be represented as a number, e.g., between 0 and 1, representing a probability or likelihood, of the result, e.g., a probability, or likelihood, that a user, or users, possess a given interest. The probability may be generated by system 102 using public data 102 and/or by system 108 using private data 110 alone or in combination with public data 102. By way of a non-limiting example, threshold 204 might be set at 0.8, such that a conclusive result indicating a strong interest in something has at least an 80% probability that the user(s) possess such an interest; and threshold 206 might be set at 0.3, such that a conclusive result indicating a weak interest in something has an associated probability of no more than 30% probability that the user(s) possess such an interest. Of course, these numbers are examples only and it should be apparent that any numeric value or probability may be used for thresholds 204 and 206.

In accordance with one or more embodiments, system 104 may make a request of validation system 108 to validate an inconclusive result, and may optionally request validation of a conclusive result. Using the edge case as an example, e.g., a user's interest cannot conclusively be determined to be strong or weak using public data 102, system 104 may direct a request to system 108, which request may comprise a query, or question, derived from the public data 102, such as and without limitation a request to provide clarification of the publicly-derived information, e.g., to provide a response indicating whether or not the user interest is a strong or weak interest. In response, validation system 108 may indicate that the interest is strong, weak, or unknown. The response provided by validation system 108 may be based on the private data 110 alone or in combination with the public data 102.

By way of another non-limiting example, the request made by system 104 may inquire whether or not private data 110 supports a result, such as and without limitation that the user interest is a strong interest, obtained by system 104 using public data 102; and the validation system 108 response may comprise a yes in reply if the private data 110 indicates at least the same level of interest as the public data 102, no if private data 110 fails to indicate at least the same level of interest as the public data 102, or unknown otherwise, e.g., there is insufficient information in the private data 110 about the user interest to respond either yes or no.

By way of a further non-limiting example, system 104 may ask validation system 108 to clarify whether an edge case may conclusively be considered a strong interest in view of the private data 110. In response, system 108 might respond with a yes, no or unknown. As yet another non-limiting example, system 104 may ask whether or not a user, or users, possess, or conversely lack, a certain interest, e.g., an interest in the San Francisco Forty-Niners national football league team. In response, system 108 might respond with a yes, no or unknown.

By way of a further non-limiting example, system 104 may make a request regarding more than one user interest at a time and/or more than one user at a time. In the case of a request involving more than one user interest, system 108 may provide a response for each interest. In the case of a request involving a group of two or more users, the request might be submitted to system 108 by system 104 to confirm whether the users as a group have a strong interest. In response system 108 might answer affirmatively if each user's interest is conclusively strong, negatively if the interest of some number of the user's is not conclusively strong or if there is not enough information in the private data 110 to answer affirmatively.

Systems 104 and 108 may implement any data mining algorithm to derive information from public data 102 and/or private data 110. By way of some non-limiting examples, data mining algorithms that may be used may include some or all of cluster analysis, anomaly detection and association rule mining. As yet some further non-limiting examples, one or more statistical models and machine learning techniques may be used by systems 104 and 108 in making a prediction, e.g., a prediction about a user's interest in something.

An interest of a user may be with respect to anything, including without limitation a product, service, hobby, food, apparel, activity, another user, content, geographic location, sport, sports team, etc. It should be apparent that the examples given herein are inexhaustive, and should not in any way limit the scope of the disclosure.

Embodiments of the present disclosure might be used in personalization applications. By way of a non-limiting example, a user interface, e.g., web page displayed in a browser application's user interface, may be personalized to include content related to one or more strong interest(s) of a user, and/or to exclude content related one or more weak interest(s) of the user. By way of a further non-limiting example, a web page may be personalized to include content related to an interest that was inconclusively strong or weak, e.g., an edge case, in order to obtain additional information about the user's interest. Of course, it should be apparent that any type of visual, audio or audio visual user interface output by a computing system may be customized or personalized in accordance with one or more user interests identified using embodiments of the present disclosure.

Embodiments of the present disclosure may be used in targeted advertising, such that on or more advertisements may be identified for presentation to a user, or users, based on the user interest(s) identified for the user(s). As yet another example, embodiments of the present disclosure may be used for auctioning advertising space, in which bids for advertising space, e.g., online advertising space, may take into account the interest of the user(s) identified using embodiments of the present disclosure. By way of a non-limiting example, advertising space providers may command a higher bid, which advertisers may be more willing to pay, since advertisements may be presented to user(s) identified as having an interest in the subject matter of the advertisements.

As yet another non-limiting example, embodiments of the present disclosure may be used to identify users that have similar interests and/or to provide a target user, or users, with a recommendation of one or more other users or one or more groups of users based on user interest(s) determined in accordance with at least one embodiment of the present disclosure. By way of a non-limiting example, a social networking site user, or users, may be provided with a recommendation of one or more users, or user groups, that the user might be interested in given an interest, or interests, determined for the site user(s) in accordance with one or more embodiments. As yet another non-limiting example, a content recommendation comprising one or more items of content may be generated for a user based on one or more interests determined for the user. A content recommendation might be generated for a user based on the user's interest(s) and content preferences of one or more users having similar interests, and one or more such interests may be determined using one or more embodiments of the present disclosure. For example, content enjoyed by the one or more users that share at least one interest with a target user may be selected for inclusion in a content recommendation for the target user.

Figure 3:
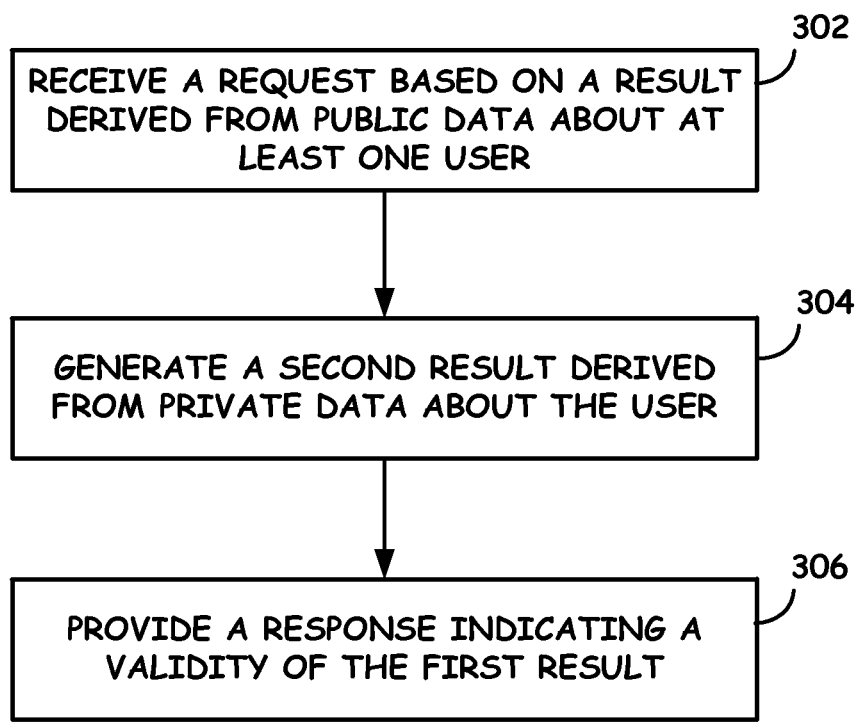

FIG. 3 provides a process flow example for use in accordance with one or more embodiments of the present disclosure. The process flow of FIG. 3 may be performed by system 110, for example. At step 302, a request is received, e.g., by system 108, which request is based on a result of an inquiry of publicly-accessible data about at least one user. The request may be comprise a request to validate the result derived from the publicly-accessible data, The result may comprise an indication of the applicability of at least one item of information, e.g., an interest, to the at least one user. A second result may be generated in response to receiving the request, at step 304. The second result may be derived from private data about the at least one user, and may be performed to determine whether the private data about the user validates the first result generated, or derived, from the public data about the at least one user. At step 306, a response may be provided. The response may comprise an indication of the validity of the first result derived from the publicly-accessible data. The response may comprise an indicator of the applicability of the at least one item of information to the at least one user.

By way of a non-limiting example, system 102 might use public data, e.g., a user profile of a user available from a social network site, to determine that the user might like soccer, but the user's interest in soccer is not conclusive. System 102 might make a request of system 108, which may be an electronic mail, or email, system, which has access to the user's emails. In response, system 108 may use the user's emails to determine whether or not the user's interest in soccer is strong enough to validate the interest determination made by system 102. In a case that system 108 has sufficient evidence, e.g., from the user's emails, that the user likes soccer, system 108 may respond and confirm the user's interest in soccer. In a case that system 108 has sufficient evidence, e.g., from the user's emails, that the user does not like soccer, system 108 may respond and deny the user's interest in soccer. In a case that system 108 lacks sufficient evidence to either confirm or deny the user's interest, then system 108 may respond with an indication that the user's interest in soccer cannot be confirmed or denied.

Figure 4:
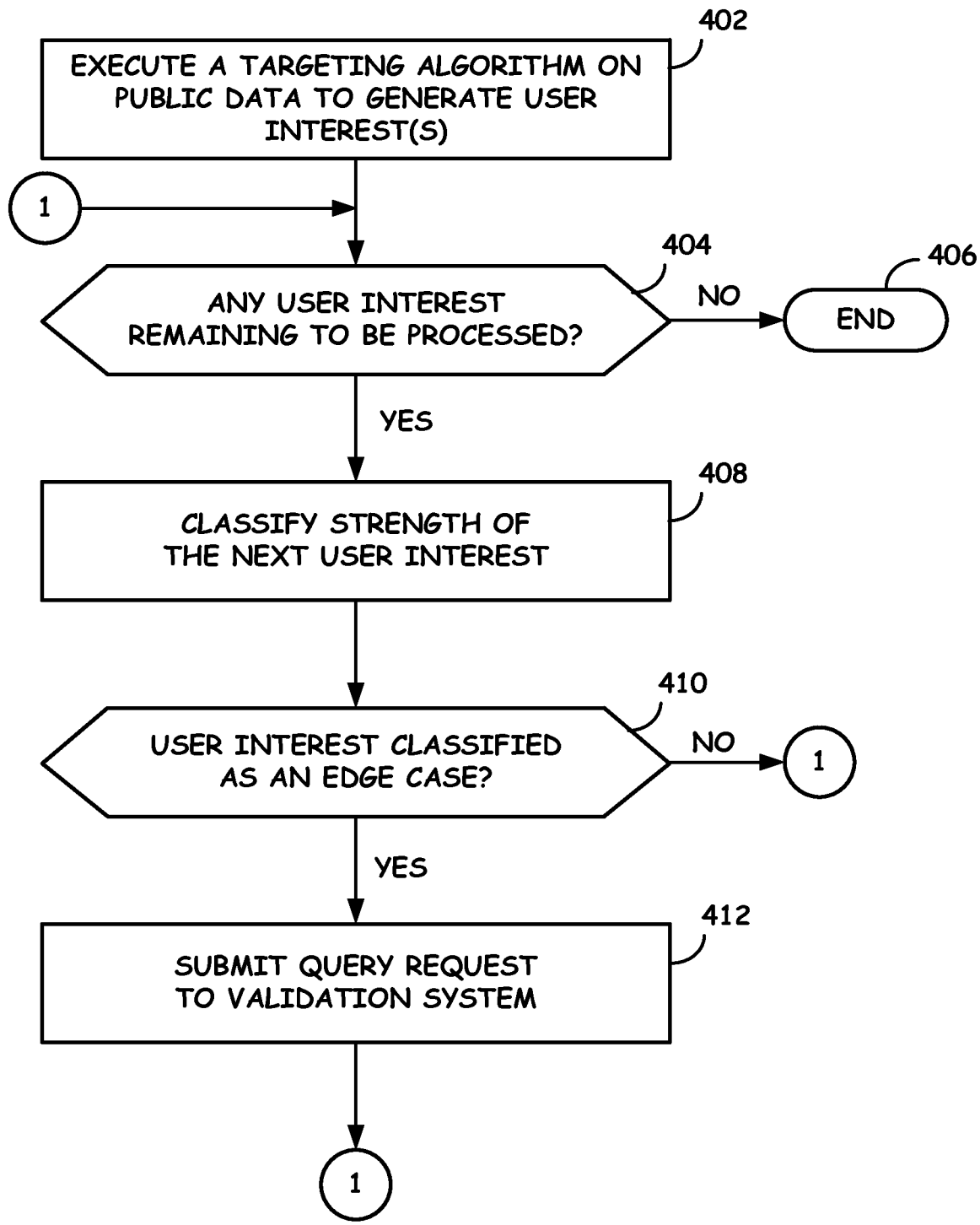

FIG. 4 provides a targeting system process flow example that may be used in accordance with one or more embodiments of the present disclosure. In accordance with one or more embodiments, the process flow shown in FIG. 4 uses public data, or publicly derived data. By way of a non-limiting example, the process flow shown in FIG. 4 may be implemented by system 104. At step 402, an algorithm, e.g., a targeting algorithm, may be executed on the publicly derived data, e.g., data 102, to generate a list of at least one user's interest(s). At step 404, a determination is made whether any user interest remains to be processed. If not processing ends at step 406.

If there is at least one interest remaining to be processed, processing continues at step 408 to classify the strength of the next user interest to be processed. By way of a non-limiting example, the user interest may be classified as belonging to one of three buckets: a strong bucket, which indicates a strong interest by the user(s), a weak bucket, which indicates a weak interest by the user(s), or an edge case bucket, which indicates that although the user(s) appears to be interested, the result is inconclusive.

At step 410, a determination is made whether the user interest is classified as an edge case, at step 408. If not, processing continues at step 404 to process any remaining user interest(s). If so, processing continues at step 412 to submit a request to validate the user interest, e.g., the request may comprise a query and may be directed to validation system 108 to perform the query on private data, e.g., private data 110. Processing continues at step 404 to process any remaining user interest(s).

Figure 5:
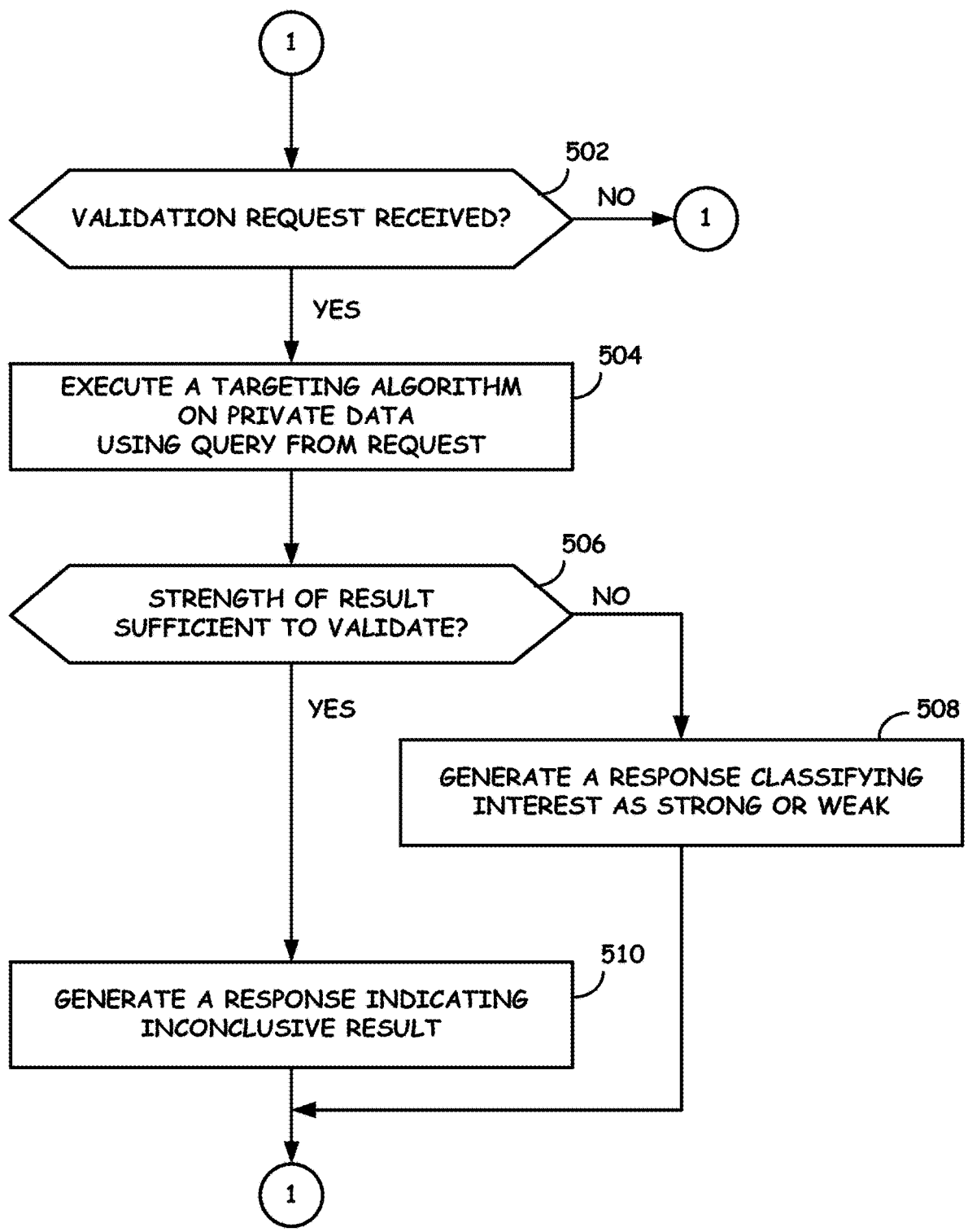

FIG. 5 provides a validation system process flow example that may be used in accordance with one or more embodiments of the present disclosure. In accordance with one or more embodiments, the process flow of FIG. 5 uses a collection of private data. By way of a non-limiting example, the process flow shown in FIG. 5 may be implemented by validation system 108, which may use private data 110. At step 502, a determination is made whether a validation request is received. By way of a non-limiting example, a request submitted at step 412 of FIG. 4. If no request is received, processing continues at step 502 to await receipt of a request.

If it is determined, at step 502, that a request has been received, processing continues at step 504. At step 504, an algorithm, e.g., a targeting algorithm, may be executed on the collection of private data using the query submitted for an edge case, such as an edge case identified using the process flow of FIG. 4. By way of a non-limiting example, the query may be a function ƒ, the collection of private data may be represented as X, and the value of ƒ(x) may be yes indicating that the user has a strong interest, no indicating that the user has no, or a weak, interest, or unknown indicating that a determination could not be made about the user's interest from the private data.

At step 506, a determination is made whether the strength of the result generated using the query on the private data is sufficient to validate the user interest, e.g., to indicate that the interest is either strong or weak. If so, processing continues at step 508 to generate a response classifying the user interest as strong, or weak. If not, processing continues at step 510 to generate a response indicating an inconclusive result. In either case, processing continues at step 502 to await receipt of another request.

By way of a non-limiting example, a response generated at either step 508 or step 510 may be used by the requester, e.g., system 104, which may act on the user interest based on the response. By way of a further non-limiting example, system 104 may use a strong interest to identify an advertisement for targeted advertising, identify content for personalizing a user experience, identify users, user groups, content items, etc. for recommendation to a user based on a strong user interest.

In the example of FIGS. 4 and 5, the targeting algorithm executed at step 504 on private data uses a query derived from publicly available data using the targeting algorithm executed at step 402. In accordance with at least one embodiment, any interest for which there is no supporting evidence in publicly available data need not be posited as a query on the private data. In accordance with one or more embodiments, the process flows of FIGS. 4 and 5 are performed by components of a closed system and resulting user interest(s) need not be shared outside the closed system. Alternatively, FIG. 5 may optionally include at least step 402 to confirm that there is supporting evidence in the publicly available data before performing the query on the private data and providing a response to the requester. In any case, embodiments of the present disclosure may be used to confirm or refute observations made about an individual using publicly available or openly shared data, while ensuring that nothing new is revealed about the individual, where new may refer to anything that is not already in the public domain or openly shared by the user.

Embodiments of the present disclosure provide a solution whereby private data may be used without compromising a user's privacy. In the example shown in connection with FIGS. 4 and 5, for example, a query submitted to validation system 108 is derived from public data, and a query is submitted in a case that there is at least some evidence found in the public data on which the query is based. Alternatively, system 108 may use the public data to determine whether there is enough evidence on which to base the query before providing a response to the query, which response is at least based on the private data. In accordance with one or more embodiments, systems 104 and 108 may be part of a closed system, e.g., systems 104 and 108 are provided by the same entity, or by two or more trusted entities, and the response resulting user's interest(s) is not be shared outside the closed system.

Figure 6:
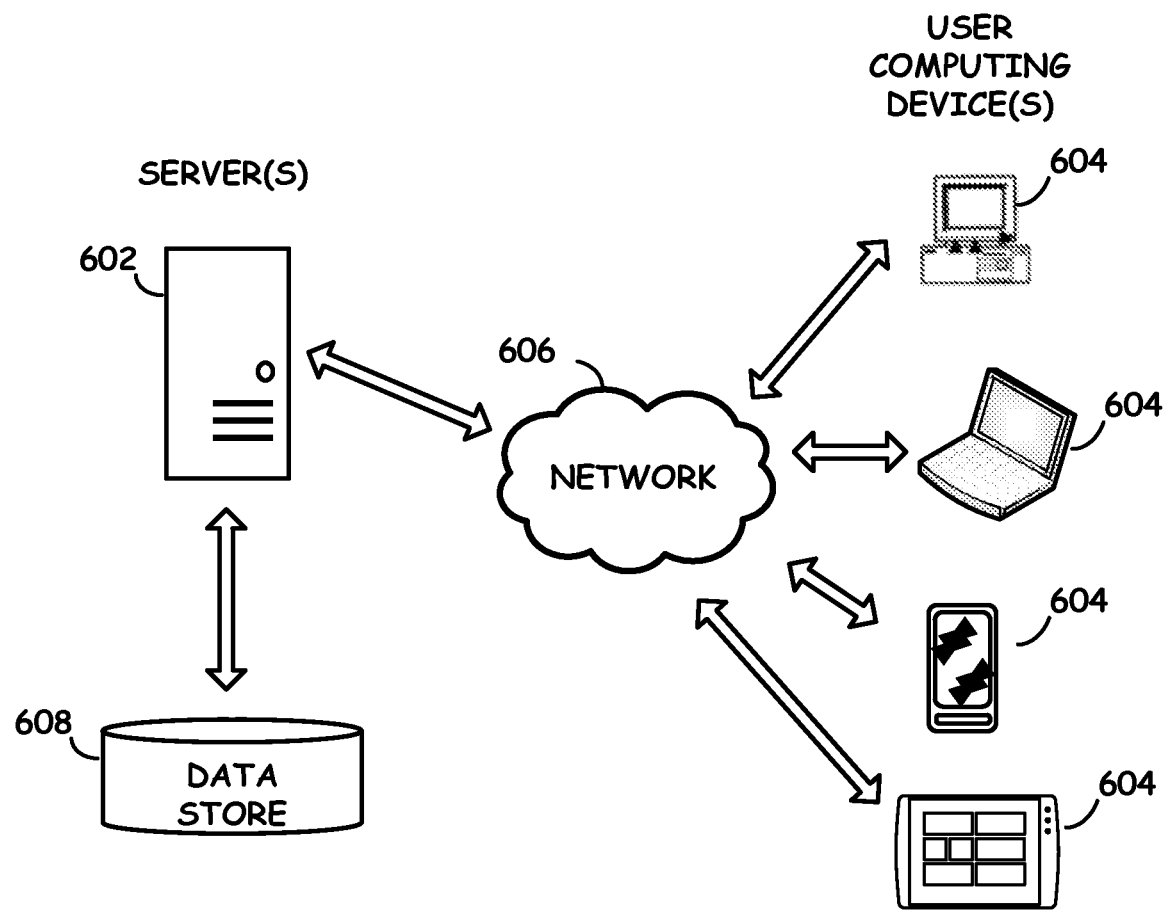
FIG. 6 illustrates some components that can be used in connection with one or more embodiments of the present disclosure.

FIG. 6 illustrates some components that can be used in connection with one or more embodiments of the present disclosure. In accordance with one or more embodiments of the present disclosure, one or more computing devices, e.g., one or more servers, user devices or other computing device, are configured to comprise functionality described herein. For example, a computing device 602 can be configured to execute program code, instructions, etc. to provide functionality in accordance with one or more embodiments of the present disclosure.

Computing device 602 can serve content to user computing devices 604 using a browser application via a network 606. Data store 608 can be used to store program code to configure a server 602 to functionality in accordance with one or more embodiments of the present disclosure.

The user computing device 604 can be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 602 and the user computing device 604 can include one or more processors, memory, a removable media reader, network interface, display and interface, and one or more input devices, e.g., keyboard, keypad, mouse, etc. and input device interface, for example. One skilled in the art will recognize that server 602 and user computing device 604 may be configured in many different ways and implemented using many different combinations of hardware, software, or firmware.

In accordance with one or more embodiments, a computing device 602 can make a user interface available to a user computing device 604 via the network 606. The user interface made available to the user computing device 604 can include content items, or identifiers (e.g., URLs) selected for the user interface in accordance with one or more embodiments of the present invention. In accordance with one or more embodiments, computing device 602 makes a user interface available to a user computing device 604 by communicating a definition of the user interface to the user computing device 604 via the network 606. The user interface definition can be specified using any of a number of languages, including without limitation a markup language such as Hypertext Markup Language, scripts, applets and the like. The user interface definition can be processed by an application executing on the user computing device 604, such as a browser application, to output the user interface on a display coupled, e.g., a display directly or indirectly connected, to the user computing device 604.

In an embodiment the network 606 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

It should be apparent that embodiments of the present disclosure can be implemented in a client-server environment such as that shown in FIG. 6. Alternatively, embodiments of the present disclosure can be implemented with other environments. As one non-limiting example, a peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

FIG. 7 is a detailed block diagram illustrating an internal architecture of a computing device, e.g., a computing device such as server 602 or user computing device 604, in accordance with one or more embodiments of the present disclosure. As shown in FIG. 7, internal architecture 700 includes one or more processing units, processors, or processing cores, (also referred to herein as CPUs) 712, which interface with at least one computer bus 702. Also interfacing with computer bus 702 are computer-readable medium, or media, 706, network interface 714, memory 704, e.g., random access memory (RAM), run-time transient memory, read only memory (ROM), etc., media disk drive interface 720 as an interface for a drive that can read and/or write to media including removable media such as floppy, CD-ROM, DVD, etc. media, display interface 710 as interface for a monitor or other display device, keyboard interface 716 as interface for a keyboard, pointing device interface 718 as an interface for a mouse or other pointing device, and miscellaneous other interfaces not shown individually, such as parallel and serial port interfaces, a universal serial bus (USB) interface, and the like.

Memory 704 interfaces with computer bus 702 so as to provide information stored in memory 704 to CPU 712 during execution of software programs such as an operating system, application programs, device drivers, and software modules that comprise program code, and/or computer-executable process steps, incorporating functionality described herein, e.g., one or more of process flows described herein. CPU 712 first loads computer-executable process steps from storage, e.g., memory 704, computer-readable storage medium/media 706, removable media drive, and/or other storage device. CPU 712 can then execute the stored process steps in order to execute the loaded computer-executable process steps. Stored data, e.g., data stored by a storage device, can be accessed by CPU 712 during the execution of computer-executable process steps.

Persistent storage, e.g., medium/media 706, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
    making a user interest determination, by a server of an online content system and using publicly-accessible data about a user, the user interest determination identifying a user interest of the user;
    making a submission, by the online content system server and to a user-interest validation system of an online service provider, the user-interest validation system comprising a private data store of data about online activities of the user in connection with the online service provider, the submission comprising a request to confirm the user interest using the data of the private data store;
    receiving, by the online content system server and from the user-interest validation system, a response to the request, the response indicating, without divulging any of the private data used to generate the response, an inconclusive result representing that the user interest determination made using the publicly-accessible data about the user is inconclusive in view of at least the private data;
    in response to receiving the response indicating the inconclusive result, generating a content presentation designed to illicit information about the user's interest, the generating comprising using, by the online content system server, the user interest in selecting a content item associated with the user interest; and
    providing, by the online content system server and to the user via a client computing device and an electronic communications network, a content presentation personalized for the user, the content presentation comprising the selected content item.

2. The method of claim 1, determining the user interest further comprising:
    identifying, by the online content system server and using the publicly-accessible data about the user, that the user interest determination is inconclusive in view of the publicly-accessible data about the user; and
    the submission is made to the user-interest validation system in response to the determination indicating that the user interest of the user is inconclusive in view of the publicly-accessible data about the user.

3. The method of claim 2, the user interest determination comprising a determination that the user has at least some interest in the user interest.

4. The method of claim 2, the user interest determination comprising a strength determination indicating that a strength of the determination is neither strong nor weak.

5. The method of claim 4, the strength determination further comprising a determination that the strength of the determination represents an edge case such that the strength of the determination lies between a strong-interest threshold indicative of a strong interest and a weak-interest threshold indicative of a weak interest.

6. The method of claim 1, the inconclusive result representing that the user interest, identified using the publicly-accessible data about the user, is inconclusive in view of the private data is based on a strength determination that a strength of a determination made using the data of the private data store is neither strong nor weak.

7. The method of claim 6, the strength determination further comprising a determination that the strength of the determination represents an edge case such that the strength of the determination lies between a strong-interest threshold indicative of a strong interest and a weak-interest threshold indicative of a weak interest.

8. The method of claim 1, the private data store of data comprising electronic mail messages of the user, the response being based on contents of at least one of the electronic mail messages of the user.

9. The method of claim 1, the response to the request received from the user-interest validation system is based on both the publicly-accessible data about the user and the data of the private data store.

10. The method of claim 1, the online service provider providing both the online content system and the user-interest validation system.

11. The method of claim 1, the online content system and the user-interest validation system are provided by different entities.

12. The method of claim 1, the content presentation personalized for the user further comprising at least one item of content identified using a user interest conclusively determined to be of interest to the user.

13. A system comprising:
a processor;
a storage medium for tangibly storing thereon program logic for execution by the processor, the stored program logic comprising:
making logic executed by the processor for making a user interest determination, using publicly-accessible data about a user, the user interest determination identifying a user interest of the user;
making logic executed by the processor for making a submission, to a user-interest validation system of an online service provider, the user-interest validation system comprising a private data store of data about online activities of the user in connection with the online service provider, the submission comprising a request to confirm the user interest using the data of the private data store;
receiving logic executed by the processor for receiving, from the user-interest validation system, a response to the request, the response indicating, without divulging any of the private data used to generate the response, an inconclusive result representing that the user interest determination made using the publicly-accessible data about the user is inconclusive in view of at least the private data;
generating logic executed by the processor for generating, in response to receiving the response indicating the inconclusive result, a content presentation designed to illicit information about the user's interest, the generating comprising using, by the online content system server, the user interest in selecting a content item associated with the user interest; and
providing logic executed by the processor for providing, to the user via a client computing device and an electronic communications network, a content presentation personalized for the user, the content presentation comprising the selected content item.

14. The system of claim 13, determining the user interest further comprising:
identifying logic executed by the processor for identifying, using publicly-accessible data about the user, that the user interest determination is inconclusive in view of the publicly-accessible data about the user; and
the submission is made to the user-interest validation system, of an online service provider, in response to the determination indicating that the user interest of the user is inconclusive in view of the publicly-accessible data about the user.

15. The system of claim 14, the user interest determination comprising a determination that the user has at least some interest in the user interest.

16. The system of claim 14, the user interest determination comprising a strength determination indicating that a strength of the determination is neither strong nor weak.

17. The system of claim 16, the strength determination further comprising a determination that the strength of the determination represents an edge case such that the strength of the determination lies between a strong-interest threshold indicative of a strong interest and a weak-interest threshold indicative of a weak interest.

18. The system of claim 13, the inconclusive result representing that the user interest, identified using the publicly-accessible data about the user, is inconclusive in view of the private data is based on a determination that a strength of a determination made using the data of the private data store is neither strong nor weak.

19. The system of claim 13, the private data store of data comprising electronic mail messages of the user, the response being based on content of at least one of the electronic mail messages of the user.

20. A non-transitory computer readable storage medium for tangibly storing thereon computer readable instructions, that when executed by an online content system server, perform a method comprising:
making a user interest determination, using publicly-accessible data about a user, the user interest determination identifying a user interest of the user;
making a submission, to a user-interest validation system of an online service provider, the user-interest validation system comprising a private data store of data about online activities of the user in connection with the online service provider, the submission comprising a request to confirm the user interest using the data of the private data store;
receiving, from the user-interest validation system, a response to the request, the response indicating, without divulging any of the private data used to generate the response, an inconclusive result representing that the user interest determination made using the publicly-accessible data about the user is inconclusive in view of at least the private data;
generating, in response to receiving the response indicating the inconclusive result, a content presentation designed to illicit information about the user's interest, the generating comprising using, by the online content system server, the user interest in selecting a content item associated with the user interest; and
providing, to the user via a client computing device and an electronic communications network, a content presentation personalized for the user, the content presentation comprising the selected content item.

* * * * *